United States Patent [19]

Tellini et al.

[11] Patent Number: 4,770,674
[45] Date of Patent: Sep. 13, 1988

[54] GAS CONDITIONING FOR AN ELECTROSTATIC PRECIPITATOR

[75] Inventors: Marco G. Tellini, Montclair; Billy D. Pfoutz, Somerville, both of N.J.

[73] Assignee: Foster Wheeler Energy Corporation, Clinton, N.J.

[21] Appl. No.: 637,993

[22] Filed: Aug. 6, 1984

[51] Int. Cl.⁴ .............................................. B03C 1/00
[52] U.S. Cl. ................................. 55/5; 55/106; 423/533; 422/110; 422/111; 422/160; 422/161
[58] Field of Search ............... 55/5, 11, 105, 106, 55/73; 110/216, 217; 423/533; 422/110, 111, 160, 161; 431/28, 41; 122/1 A

[56] References Cited

U.S. PATENT DOCUMENTS

| | | |
|---|---|---|
| 1,254,992 | 1/1918 | Descamps. |
| 1,909,825 | 5/1933 | Hahn et al. ............... 55/106 |
| 1,930,125 | 10/1933 | Fowler ..................... 23/176 |
| 2,312,223 | 2/1923 | Titlestad et al. ......... 23/176 |
| 2,622,007 | 12/1952 | Allen ....................... 23/179 |
| 3,212,553 | 10/1965 | Cathala ................... 158/4 |
| 3,363,398 | 1/1968 | Wheatcroft et al. ...... 55/5 |
| 3,424,560 | 7/1966 | Carmassi et al. ........ 23/278 |
| 3,568,403 | 3/1971 | Richardson ............... 55/5 |
| 3,581,463 | 10/1967 | Roberts .................... 55/4 |
| 3,607,034 | 9/1971 | Henry et al. ............ 23/168 |
| 3,615,197 | 10/1971 | Jaeger ...................... 23/176 |
| 3,665,676 | 5/1972 | McKewen ................. 55/4 |
| 3,686,825 | 8/1972 | Busby ....................... 55/5 |
| 3,689,213 | 9/1972 | Guerrieri .................. 55/5 |
| 3,704,569 | 12/1972 | Hardison et al. ........ 55/4 |
| 3,719,471 | 3/1973 | Jones ....................... 75/65 |
| 3,722,178 | 3/1973 | Haaland et al. .......... 55/4 |
| 3,818,682 | 6/1974 | Farrow et al. ............ 55/106 |
| 3,837,785 | 9/1974 | Evans et al. .............. 431/5 |
| 3,885,904 | 5/1927 | Feng ......................... 431/11 |
| 3,893,828 | 7/1975 | Archer ..................... 55/104 |
| 3,966,436 | 6/1976 | Archer ..................... 55/147 |
| 3,993,429 | 11/1976 | Archer ..................... 431/5 |
| 4,035,165 | 7/1977 | Archer ..................... 55/13 |
| 4,058,372 | 11/1977 | DeLaMater ............... 55/5 |
| 4,179,071 | 12/1979 | Kozacka ................... 239/397.5 |
| 4,205,630 | 6/1980 | Regan ....................... 122/1 R |
| 4,208,192 | 6/1980 | Quigley .................... 55/5 |
| 4,223,640 | 9/1980 | Rochford et al. ........ 110/347 |
| 4,305,909 | 12/1981 | Willett et al. ............ 55/11 |
| 4,333,746 | 6/1982 | Southam ................... 55/106 |
| 4,411,204 | 10/1983 | Hamilton .................. 110/347 |
| 4,466,815 | 8/1984 | Southam ................... 55/5 |

FOREIGN PATENT DOCUMENTS 445460 5/1975 U.S.S.R. ................. 422/522
567496 8/1977 U.S.S.R. ................. 55/5

OTHER PUBLICATIONS

Donovan et al-Sulfuric Acid Converter Optimization Chemical Engr Progress, 9/78, pp. 51-54.

Primary Examiner—Bernard Nozick
Attorney, Agent, or Firm—Marvin A. Naigur; Thomas L. Adams

[57] ABSTRACT

Apparatus and method for precipitation of fly ash from flue gas of a coal burner wherein liquid sulfur is burned to form $SO_2$. The $SO_2$ is converted to $SO_3$ and injected into the flue gas. The sulfur burning process is modulated and controlled.

48 Claims, 4 Drawing Sheets

GAS CONDITIONING FOR AN ELECTROSTATIC PRECIPITATOR

BACKGROUND OF THE INVENTION

The present invention relates to gas conditioning for an electrostatic precipitator and in particular to on-site equipment for converting sulfur into sulfur trioxide.

Known electrostatic precipitators work most efficiently when the gas being treated has an appropriate resistivity. It is known to alter the resistivity of the gas being treated by injecting sulfur trioxide ($SO_3$). A disadvantage with this procedure is the difficulty in handling $SO_3$, a highly corrosive substance. For this reason, known practical gas conditioning devices have often produced the $SO_3$ on site by means of a sulfur burner and catalytic converter.

An important consideration in producing sulfur trioxide is maintaining the proper temperatures and mass flow rates in the process to enhance efficiency. For example, the production rate of $SO_3$ ought to be adjusted to correspond to the nature and volume of the exhaust gas to be treated. Furthermore, it is important to maintain the $SO_3$ at a sufficiently high temperature to avoid condensation and formation of $H_2SO_4$.

Known sulfur trioxide producing systems have used the temperature of gas entering a catalytic converter as a controlling variable that regulates the temperature of air entering a sulfur burner. A disadvantage with this type of control is the inability to control the temperature of gas leaving the catalytic converter. It is important to keep that temperature within a satisfactory range for the reasons given above. Also, the foregoing types of systems did not regulate according to the temperature of the air mass entering the sulfur burner. It is again important to regulate from this temperature to maintain efficient and safe operation.

Also, these known systems fail to feed-back important information about the operating parameters of the electrostatic precipitator and/or the exhaust gas associated therewith. For example, the flow rate of gas through an electrostatic precipitator can be an important variable which ought to be used to influence the production of $SO_3$.

Accordingly, there is a need for an improved gas conditioning system for an electrostatic precipitator which is regulated to operate more efficiently.

SUMMARY OF THE INVENTION

In accordance with the illustrative embodiments demonstrating features and advantages of the present invention there is provided an apparatus receiving a source of air and a sulfur-bearing source for conditioning the gas within an electrostatic precipitator of an industrial plant. The apparatus has a sulfur means, a converter means, a sensing means, a modulation means and a delivery means. The sulfur means, which has an input and an output, communicates with the sulfur-bearing source and the source of air, for at least providing gaseous oxidized sulfur. The converter means has an outlet and has an inlet communicating with the output of the sulfur means, for converting the gaseous oxidized sulfur into a conditioning medium. The sensing means is connected to the outlet of the converter means for providing a converted temperature signal signifying the temperature at the outlet of the converter means. A modulation means is connected to the sulfur means and the sensing means for varying the energy flow rate associated with the air flow from the source of air into the apparatus in response to the converted temperature signal. The delivery means is connected to the outlet of the converter means for delivering the condtioning medium to the precipitator.

Also in accordance with the same invention, the above apparatus employs an alternate sensing means similar to that just described but connected to the input of the burner means for providing an input temperature signal signifying the temperature at the input of the burner means. In this case the modulation means responds to the input temperature signal.

Also in accordance with the principles of the same invention, the above apparatus employs instead of the sensing means and modulation means, a parametric means and a throttle means. The parametric means is coupled to the industrial plant for providing a parametric signal signifying at least one operating parameter associated with the handling of the exhaust gas of the industrial plant. The throttle means is connected to the burner means for varying its incoming mass flow rate in response to the parametric signal.

Also in accordance with the same invention, a method is provided which employs a sulfur burner for conditioning the gas within an electrostatic precipitator of an industrial plant. The method includes the step of burning sulfur and air that enters the burner to form their combustion products. The method also includes the step of converting the combustion products into a conditioning medium. Another step is sensing the post-conversion temperature of the conditioning medium and modulating the energy flow rate to the burner by an amount bearing a predetermined relationship to this post-conversion temperature. Another step of the method is delivering this conditioning medium to the precipitator. In a related method of the same invention employing steps as described above, the method is altered in that instead of sensing the post-conversion temperature, the method includes the step of sensing the pre-burn temperature of mass entering the burner.

Also in a related method of the same invention the foregoing method is altered to not perform the steps of sensing the post-conversion temperature and modulating the energy flow rate but instead perform the steps as follows: the step of sensing at least one operating parameter associated with the handling of the exhaust gas of the industrial plant; varying the flow rate of mass entering the burner by an amount bearing a predetermined relationship to the operating parameter.

BRIEF DESCRIPTION OF THE DRAWINGS

The above brief description as well as other features and advantages of the present invention will be more fully appreciated by reference to the following detailed description of a presently preferred but nonetheless illustrative embodiment in accordance with the present invention when taken in conjunction with th accompanying drawings, wherein.

DETAILED DESCRIPTION OF THE PREFERRED EMBODIMENT

Figure 1:
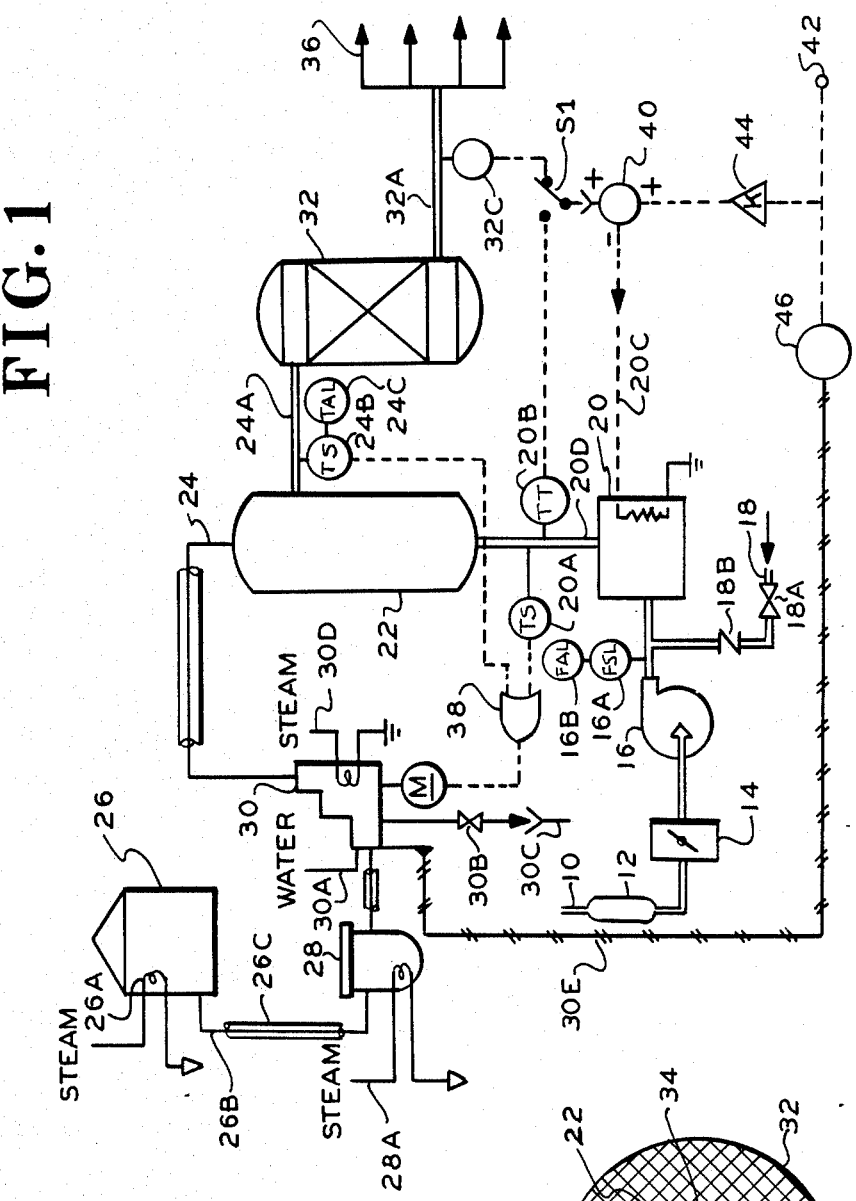
FIG. 1 is a schematic diagram of an apparatus for conditioning the gas within an electrostatic precipitator, according to the principles of the present invention.

Referring to FIG. 1, the illustrated apparatus receives air from a source of air 10, a duct vented to the atmosphere feeding air filter 12. Filter 12 is coupled through damper 14 to blower 16. Blower 16 can be rated at 320 SCFM at 100" W.C. and can be driven by a 10 hp motor (not shown). The output of blower 16 communicates with an auxiliary air source 18 which is supplied for purging purposes. Source 18 connects through block valve 18A and check valve 18B to the output of blower 16 which connects to the input of a modulation means, shown herein as airheater 20. Airheater 20 may be a commercially available heater such as three Chromalox or equivalent type airheaters connected in series, each rated at 15 kw. Connected to the output of blower 16 is flow sensor 16A which produces a signal indicating the existence of an insufficiently low flow rate. Such an insufficient flow can trigger an alarm through flow alarm 16B to produce an audible or visible signal.

A burner means (also referred to as a sulfur means) is shown herein as reactor vessel 22 which may be a sulfur burner filled with refractory balls. While sulfur burner 22 has air injected vertically upward by duct 20D through the bottom of the burner, sulfur is supplied by line 24 through the top in an opposing direction. The opposition of the two flows together with the turbulence caused by the refractory balls insures for complete combustion of the sulfur into sulfur dioxide ($SO_2$). A source of sulfur, shown herein as tank 26, may be heated by steam from an industrial plant associated with the apparatus of FIG. 1. This steam is conducted through heating coils 26A to insure that the sulfur remains freely in the liquid state. The output line 26B of sulfur source 26 is surrounded by steam jacket 26C to insure that the sulfur remains heated. Sulfur tank 26 may, in practical embodiments, have appropriate fire protection devices and air purging inlets to facilitate proper operation thereof. In one preferred embodiment, the sulfur storage tank was 12 feet in diameter and 15 feet high. Also, sulfur tank 26 can be externally filled by an appropriated sulfur pump through various block valves (neither valves nor pump shown).

The sulfur from tank 26 can flow through basket type filter 28 which may be one of several filters connected in parallel. Filter 28 also carries heating steam along line 28A to heat the contents of filter 28.

The outlet of filter 28 communicates through steam jacketed lines to a throttle means, shown herein as sulfur means 30. Sulfur means 30 is, in one proposed embodiment, a sulfur feed pump rated at 6 GPH at 50 PSI and driven by ¼ hp motor M. Sulfur pump 30 has a cooling water inlet 30A which drains through block valve 30B to drain 30C. This cooling water protects the bearings of sulfur pump 30. Also, pump 30 employs steam through line 30D to keep the liquid sulfur within the pump at a properly high temperature. The extent to which pump 30 pumps is regulated by a pneumatic signal on line 30E which connects to an input of pump 30.

Figure 2:
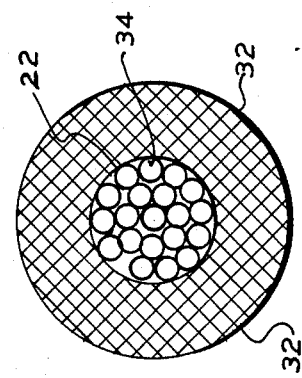
FIG. 2 is a cross-sectional view of a combined sulfur burner and catalytic converter which may be used in the apparatus of FIG. 1.

The gaseous $SO_2$ produced in the burner 22 as the combustion products of the incoming oxygen and sulfur, exit through line 24A to the input of a converter means, shown herein as catalytic converter 32. Converter 32 can contain vanadium pentoxide ($V_2O_5$) supported by a silica gel. Such a catalyst material is commercially available from various suppliers such as Monsanto. In one especially preferred embodiment, sulfur burner 22 and catalytic converter 32 are formed as nested coaxial vessels. Referring to FIG. 2, the sulfur burner is shown as a central chamber containing refractory balls 34 as previously mentioned. The vanadium pentoxide 32A is shown contained within vessel 32 outside vessel 22. The upper portions of vessels 22 and 32 communicate so that $SO_2$ formed in reactor 22 can flow upwardly (in the same direction as the incoming combustion air), communicate to the top of vessel 32 and flow downwardly through the vanadium pentoxide 32A. In a known manner, the vanadium pentoxide can catalytically convert the $SO_2$ into $SO_3$. A combined nested reactor vessel of this type is commercially available from Ballestra, S.p.A. of Milano, Italy, although other types of reactors can be used instead.

The output from converter 32 connects through line 32A (FIG. 1) to a delivery means 36, shown in the form of a plurality of lance-type probes for injecting conditioning gas into the inlet line of an electrostatic precipitator (shown hereinafter).

The connection between burner 22 and converter 32, schematically illustrated as line 24A, connects to a temperature sensor 24B which can sense an unacceptably low temperature and trigger low temperature alarm 24C. A low temperature signal from sensor 24B connects to one input of OR gate 38 whose other input connects to the output of low temperature sensor 20A which is able to sense a low temperature at the output of airheater 20. If either of these low temperature signals are received at gate 38, the gate can turn off motor M. This feature assures that low temperature does not cause insufficient combustion and/or sulfur fouling of the burner vessel.

Two alternately usable sensing means are shown herein as temperature transmitters 20B and 32C. These temperature transmitters can be alternatively selected by switch S1. In most practical embodiments, switch S1 will not be actually used but a choice will be made initially whether sensing is to be performed from either the location of sensors 20B or 32C. The control signal selected by switch S1 is coupled to a summing node 40 which may be an appropriate control device such as an operational amplifier having various summing inputs. In this embodiment the output of node 40 is inverted and applied as a modulated power input to line 20C which is the electric heating element of airheater 20. Accordingly, this electrical heater may be employed as a means for varying the temperature of the airflow through heater 20.

A parametric signal is applied at terminal 42 from a parametric means (shown hereinafter). This parametric signal can relate to measurable properties of the electrostatic precipitator (shown hereinafter), its gas flow and of supporting devices associated with it. This parametric signal is connected through a scaling amplifier 44 to another input of summing node 40. Terminal 42 also connects to an electrical to pneumatic transducer 46 to provide a pneumatic control signal along line 30E to sulfur pump 30.

To facilitate an understanding of the principles associated with the apparatus of FIGS. 1 and 2, its operation will now be briefly described. Steam is supplied from the associated industrial plant to lines 26A, 28A and 30D as well as the various steam jackets for the sulfur conducting lines, to keep the sulfur in a liquid state. Also, water is passed through line 30A to drain 30C to cool the bearings of pump 30. It will further be assumed that the parametric signal on terminal 42 is at and remains at some constant value for a given period of time. Consequently, transducer 46 applies a constant drive signal to sulfur pump 30 command it to operate at a corresponding constant pumping speed.

For pump 30 to operate however, motor M must be activated. At start-up, the temperature on lines 20D and 24A will be low so that temperature sensors 24B and 20A both apply unacceptably low signals to OR gate 38 which keeps motor M off. However, temperature transmitter 32C (or if selected, transmitter 20B), issues a low signal causing node 40 to issue a relatively high signal along line 20C to heat the air passing through airheater 20. Consequently, this heated air travels through burner 22 and converter 32 causing an acceptably high temperature signal to issue from sensors 24B and 20A. Therefore, OR gate 38 energizes motor M causing sulfur to be pumped through pump 30 into burner 24.

The liquid sulfur pouring down into burner 22 cascades across the refractory balls 34 (FIG. 2) causing thorough combustion with the heated air passing upwardly through duct 20D. The $SO_2$ produced thereby passes through converter 32 to produce $SO_3$. This $SO_3$ reaches probes 36 to condition the gas in an electrostatic precipitator (described hereinafter).

As the process continues, the temperature sensed at the output line 32A by transmitter 32C (or transmitter 20B) indicates a rising temperature due to the heats of combustion conversion and the effect of airheater 20. Consequently, this high temperature signal is conveyed through switch S1 to summing node 40 to decrease the drive on line 20C to airheater 20. Thus, the system is controlled to optimize the energy and heat balance and produce a regulated temperature either at duct 32A or duct 20D, depending upon whether temperature transmitter 32C or 20B is selected, respectively.

The production rate of $SO_3$ can be varied in response to the parametric signal on terminal 42. This parametric signal (originally assumed to be constant) can be a variable related to the volumes passing through an electrostatic precipitator, an indication of the amount of conditioning gas that may be required by the precipitator. Therefore, an increase occurring to the signal at terminal 42 can be conveyed through line 30E to increase the pumping rate of sulfur pump 30. Consequently, the increased flow rate of sulfur into burner 22 eventually results in an increased flow rate of $SO_3$ into probes 36. Also, this increased production rate requirement is coupled through amplifier 44 to summing node 40. The increased production rate causes the drive applied along line 20C to airheater 20 to decline. This decline in airheater drive follows from the fact that an increased burning rate of sulfur tends to increase the temperature within the burner 22 anyway. If the system is to be shut down, the sulfur flow is terminated and purge air introduced as follows: At this time block valve 184 may be opened to allow auxiliary air from the associated industrial plant to also pass through airheater 20 and purge the system.

Figure 3:
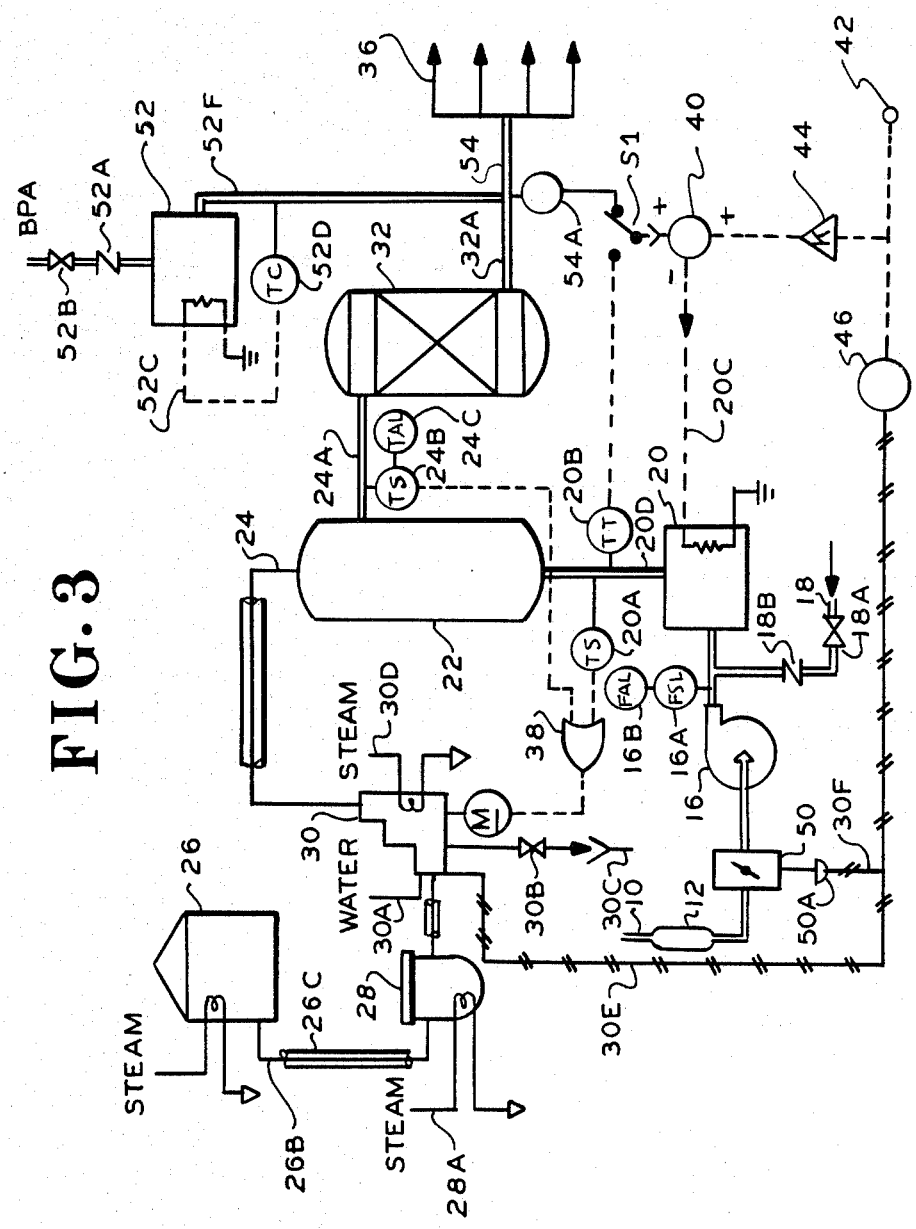
FIG. 3 is a schematic diagram of an apparatus which is an alternate to that disclosed in FIG. 1.

Referring to FIG. 3, a modified embodiment is illustrated in which components identical to those previously described in FIG. 1 bear the same reference numerals. One difference in the structure of the apparatus of FIG. 3 is the addition of a pneumatic branch line 30F from line 30E connecting to a diaphragm 50A of a modulation means 50 which operates as a means for varying the rate of air flow from blower 16. Diaphragm 50A can operate the damper within modulation means 50 so that it operates as a throttle means for restricting air flow.

Also shown herein is an additional airheating means 52, supplied through check valve 52A and block valve 52B by an air supply BPA which is preferably preheated air from a boiler. Heater 52 may be constructed similarly to heater 20. Electrical heater line 52C of airheater 52 connects to a control means in the form of a temperature controller 52D coupled to sense the temperature at the output duct 52F of the airheater 52. Temperature controller 52D is connected to regulate the heat input so that the output temperature at duct 52F is kept constant at, for example, 350°. Ducts 52F and 32A merge into duct 54 which feeds the previously mentioned probes 56. The temperature at duct 54 is monitored by temperature transmitter 54A which senses the combined temperature caused by the mixing of the outputs from ducts 52F and 32A. Transmitter 54A is connected to switch S1 in a manner similar to that described previously for transmitter 32C (FIG. 1).

The operation of the apparatus of FIG. 3 is similar to that previously described for FIG. 1. However, the parametric signal on terminal 42 can additionally regulate the volume or flow rate of air through blower 16 in proportion to the flow rate of sulfur through pump 30. Therefore, the mass flow rate of sulfur and air into burner 22 can increase and decrease synchronously depending upon the parametric signal. This feature can be useful in that there is no change in the concentration of sulfur dioxide and air passing through duct 24A since both the sulfur and air flow rate can be simultaneously modulated.

The modulation of air is achievable under this particular embodiment because the excess air to the probes is supplied by the auxiliary source BPA and need not be supplied by air intake 10.

Also, the auxiliary heated supply through heater 52 can reduce the demand for high temperatures at line 32A. It is desirable to keep the temperature at the probe 36 above a certain temperature so that the sulfur trioxide does not condense. However, this required temperature may not be the one at which burner 22 and converter 32 operate most efficiently. Therefore, the injection of heated air into duct 54 can allow independent temperature adjustment.

Subject to the foregoing mixing of heated air, the temperature sensed at duct 54 by transmitter 54A can be used to alter the extent to which airheater 20 heats the air passing through it to establish operating temperatures within vessels 22 and 32, in a manner previously described.

Figure 4:
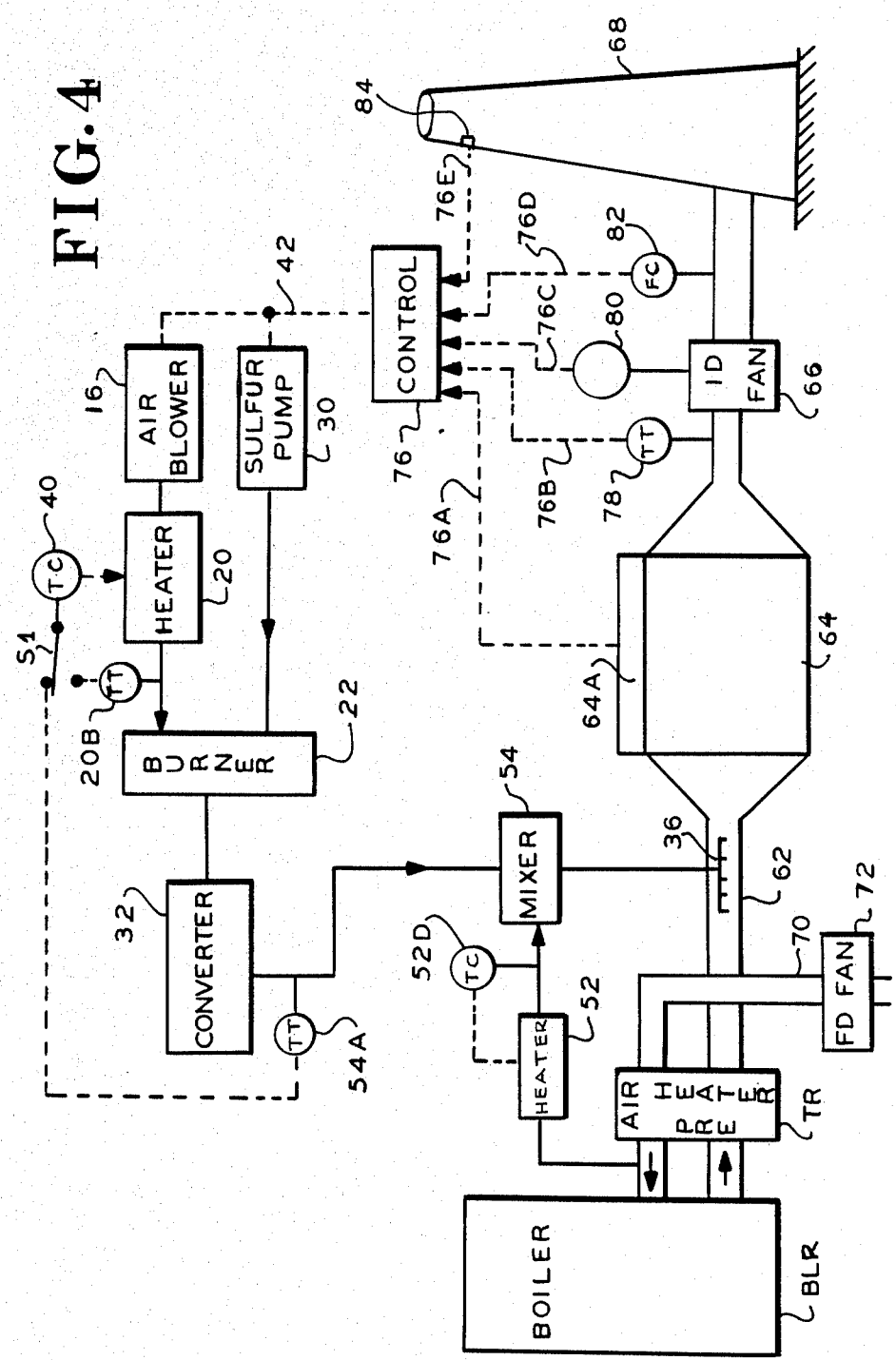
FIG. 4 is a schematic diagram showing an apparatus which is an alternate to that disclosed in FIG. 1 and showing the apparatus connected to an industrial plant.

Referring to FIG. 4, it shows a boiler BLR discharging an exhaust gas through duct 62 to an electrostatic precipitator 64. The output of precipitator 64 leads to an induced draft fan 66 discharging to stack 68. In this embodiment, the exhaust of duct 62 gives up heat in air preheater TR by transferring heat to the incoming air of duct 70 which is supplied through forced draft fan 72.

In this Figure, the previously described subsystems of FIG. 3 are illustrated by simplified block diagram combining many detailed components into large blocks. The blocks are identified by reference numerals used in FIG. 3 to identify the central component contained in the relevant block of FIG. 4. Accordingly, burner 22 is shown fed by sulfur pump 30 and by airheater 20 supplied by air blower 16. Burner 22 feeds catalytic converter 32 whose output is mixed with auxiliary heated air in mixer 54 and fed to probes 36. Probes 36 are shown installed in the inlet duct 62 of electrostatic precipitator 64. The output temperature of heater 52 is regulated by temperature controller 52D. Heater 52 is tapped into the duct fed by forced draft fan 72 at the connection to boiler BLR. Again, temperature transmitters 54A and 20B are connected to the outputs of converter 32 and heater 20, respectively. The output of one of these transmitters 54A and 20B may be selected by switch S1 to drive temperature controller 40 to regulate heater 20.

The parametric means shown herein includes control system 76 having various inputs applied hereto. The output on line 42 of control 76 is connected to controlling inputs of blower 16 and sulfur pump 30. Thus, the parametric means 76 can control the rate at which blower 16 and pump 30 operate. It will be noted that unlike the arrangement of FIG. 3, temperature controller 40 in this embodiment need not be regulated by the parametric signal on line 42.

Five inputs are shown to control system 76 but it will be appreciated that a different number may be employed in other embodiments. Input 76A is connected to the electrical control 64A of electrostatic precipitator 64. Line 76A may be so connected as to sense the power delivered to the precipitator 64. Accordingly, control 76 can operate to increase the drive to pump 30 and blower 16 if the power delivered in the precipitator is low. This allows the rate of $SO_3$ generation to increase and further condition the exhaust gas in the precipitator 64, thus increasing the amount of work being done by it.

Input line 76B of control system 76 connects to temperature transmitter 78 which senses the temperature of the gas flowing from precipitator 64 into induced draft fan 66. An increase in this temperature is an indication of a high energy level in the exhaust gas from the precipitator 64 and therefore a significantly contaminated exhaust gas. Consequently, control system 76 responds to an increase in the temperature of the exhaust gas from precipitator 64 by increasing the drive to the pump 30 and blower 16 to provide more conditioning gas to thereby increase the extent of precipitation in precipitator 64.

Input 76C of control 76 connects to motor 80. For example, line 76C can be so connected to transfer a signal corresponding to the current (or power) applied to motor 80. An increase in this current (or in the power absorbed by motor 80) is an indication of the flow rate through the precipitator 64 and thus an indication of the amount of work which it must do. Accordingly, control system 76 responds to an increase in the current or power into motor 80 by increasing the drive to blower 16 and pump 30 thereby producing more conditioning gas for increasing the amount of useful work performable by precipitator 64.

Input 76D connects to flow sensor 82 which measures the flow rate of gas between the induced draft fan 66 and the stack 68. This flow rate also is an indication of the volume passing through precipitator 64. Again, control system 76 increases the rate of production of the $SO_3$ in response to an increased flow rate so that precipitator 64 can produce more useful work. Another input on line 76E connects to an opacity sensor 84 within stack 68. Opacity sensor 84 can employ a light source shining through the stack gases onto a photoelectric device such as a phototransistor. In this embodiment, increased opacity of stack gas indicates a need for additional cleansing. Accordingly, control system 76 responds to an increase in measured opacity by increasing the flow rate of blower 16 and pump 30. This results in a higher production rate of $SO_3$ so that precipitator 64 can perform more useful work.

The following description of the operation of the apparatus of FIG. 4 is similar to that of FIG. 3 except for additional detailed description of the parametric control system 76. Boiler BLR operates with a conventional forced and induced draft fan 72 and 66 to circulate air through ducts 70 and 62 and through precipitator 64 before discharge through stack 68. A portion of the air heated by airheater TR is drawn off and additionally heated through auxiliary electrical heater 52, its temperature being regulated to a predetermined temperature such as 400° F. by temperature controller 52D. This heated air is mixed with the conditioning medium from converter 32 in mixer 54 and injected by probes 36 to condition the gas in precipitator 64. Temperature sensors 54A and 20B are connected to the output of converter 32 and heater 20, respectively, and operate in a fashion similar to the similarly identified components described in connection with FIG. 1 and FIG. 2. Specifically, either one may be selected by switch S1 to regulate the heat transfer of heater 20 by means of controller 40.

The various operating parameters associated with the precipitator 64, induced draft fan 66 and stack 68 can be processed by control 76. In one preferred embodiment, control 76 includes an operational amplifier having mixing resistors (some of which may be inverting inputs) to provide an output which is a linear combination of the inputs. Accordingly, depending upon the demand issued from line 42, the production rate of $SO_3$ can be varied by changing the flow rates of blower 16 and pump 30. In a manner previously described, additional heat can be added to the air flow from blower 16 by the sensing of a temperature deficiency by temperature transducers 54A or 20B.

Figure 5:
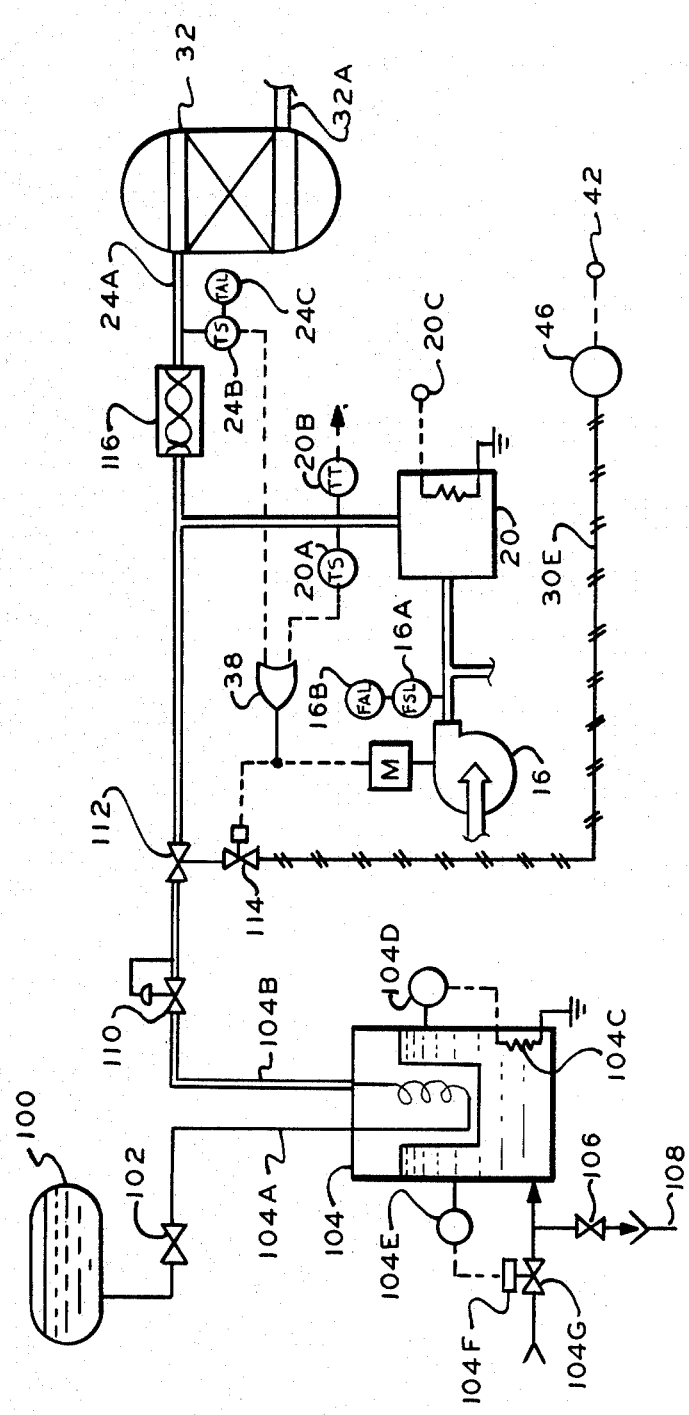
FIG. 5 is a schematic diagram of an apparatus which is an alternate to that of FIGS. 1 and 3.

Referring to FIG. 5 it shows the previously mentioned catalytic converter 32 and its outlet 32A, the latter understood as connected to (but not shown connected to) the previously mentioned apparatus of FIGS. 1 or 3. Similarly transducer 46 is shown connected to previously described terminal 42 and thus to the previously illustrated apparatus associated therewith. Similarly, electrical line 20C of airheater 20 connects to that apparatus previously described in connection with FIGS. 1 or 3. Similar remarks apply to blower 16 whose input derives from the apparatus shown in FIGS. 1 or 3. Apparatus in FIG. 5 having a reference numeral less than 100 was previously described in connection with FIGS. 1 or 3 and therefore need not be described further hereinafter.

A supply of liquid, oxidized sulfur 100, namely $SO_2$, is contained in pressurized tank. The outlet line of tank 100 leads through block valve 102 to an inlet of a sulfur means 104, shown herein as an evaporator having an inlet 104A and an outlet 104B. As illustrated herein evaporator 104 holds a water bath heated by electrical coil 104C whose current is regulated by thermostatic device 104D. Thus, the bath of evaporator 104 is kept at a predetermined temperature well suited for evaporating the $SO_2$ flowing from tank 100. Also, the water level within evaporator 104 is regulated by level sensing transducer 104E which controls solenoid 104F and thus water inlet valve 104G. This arrangement keeps the correct water level within the evaporator. In this embodiment the water bath of evaporator 104 is regulated to a temperature just below boiling. Evaporator 104 can be drained by means of a drain valve 106 coupled to the output of block valve 104G. Valve 106 feeds a drain 108.

Evaporator 104 may be a commercially available evaporator. For example a series 50-202 evaporator manufactured by Wallace and Tiernan will operate satisfactorily. Other evaporators can be employed, depending upon the desired capacity, temperature, rate and other requirements.

The outlet 104B of evaporator 104 contains gaseous oxidized sulfur ($SO_2$) at a relatively high pressure. The pressure is reduced by pressure reducing valve 110 and fed to regulating valve 112. Pressure regulating valve 112 is hydraulically operated by previously described line 30E. Line 30E is coupled to valve 112 through normally open valve 114. Valve 114 is a solenoid-operated valve driven by the output of NOR gate 38, which output also connects to the input of motor M used to drive previously mentioned blower 16. NOR gate 38, as before, recieves the outputs from temperature sensors 24B and 20A. If these temperatures are within acceptable limits, normally open valve 114 is kept open and motor M remains energized. This feature again prevents sulfur dioxide and air from flowing in the system when the operating temperatures are improper.

The output of flow regulating valves 112 communicates with the output of air heater 20 and both lead to the input of a helical mixer 116. Mixer 116 may be a static inline mixer to homogenize the $SO_2$/air stream. Mixer 116 has an internal helical element used to thoroughly mix the air and $SO_2$. The output of mixer 116 connects to the previously described line 24A, the inlet to catalytic converter 32.

The following description of the operation of the apparatus of FIG. 5 is similar to that given in connection with FIGS. 1 and 3, except for the use of liquid $SO_2$. Assuming that the temperatures sensed by sensors 20A and 24B are within an acceptable range, motor M is commanded to drive blower 16 at rated speed and block valve 114 is open. Therefore the flow control signals on line 30E are effective to regulate the flow through valve 112. Consequently, the pressurized liquid $SO_2$ in tank 100 flows through block valve 102 into the evaporator coils of evaporator 104. As mentioned before the water level and temperature is regulated to effectuate complete evaporation. Consequently gaseous $SO_2$ flows through line 104B, to have its pressure reduced by valve 110. Thereafter the flow, as regulated by valve 112, produces a flow of $SO_2$ toward mixer 116. The volume of flow through valve 112 is regulated as before in response to signals at terminal 42 corresponding to certain operating parameters of the precipitators and its environs. Also flowing toward mixer 116 is the output from airheater 20. As was the case in FIGS. 1 and 3, the volume and temperature of air from airheater 20 can be regulated to produce the desired energy flow.

The combined flow of air and $SO_2$ into mixer 116 produces a homogeneous output at line 24A. The resulting flow into catalytic converter 32 produces at outlet 32A, $SO_3$. As before, the $SO_3$ is used as a conditioning medium and is fed to the previously mentioned probes in the electrostatic precipitator. As before, the output temperature at line 32A can be used to regulate the electrical drive to airheater 20 to vary the output temperature from it. Again the electrical drive to airheater 20 can be influenced also by the parametric signal provided on line 42. Furthermore, in some embodiments (as per FIG. 3) the parametric signals on line 42 can be used to control a damper feeding blower 16 to regulate its volume of airflow.

It is to be appreciated that various modifications may be implemented with respect to the above described preferred embodiments. For example, the various transfer functions associated with the controllers described herein can be altered depending upon the characteristics of the associated plant or depending upon the desired response time. Furthermore, numerous temperature sensors, flow sensors, pressure sensors and other sensors can be installed in the various lines described herein to monitor additional process variables. Also, the construction of the burner and catalytic converter can be altered depending upon the desired flow rate, conversion efficiency, operating temperature, reliability, size constraints, etc. Also, while various steam heating coils and water cooling lines are illustrated in other embodiments they may be eliminated or replaced by other means such as electrical means. Also, the regulation of various pumps and air and blowers can be accomplished by various alternate techniques. Other forms of communication can be used in different embodiments. Furthermore, while various electrical controls are shown, fluidic or computer circuits can be used in other embodiments.

Obviously, many modifications and variations of the present invention are possible in light of the above teachings. It is, therefore, to be understood that within the scope of the appended claims, the invention may be practiced otherwise than as specifically described.

What is claimed is:

1. Apparatus receiving a source of air and a source of sulfur-bearing liquid for conditioning the gas within an electrostatic precipitator in the exhaust stage of an industrial plant, comprising:

a chamber means having an output and an input, said chamber means communicating with said source of sulfur-bearing liquid and said source of air, for raising the temperature and changing the condition of said liquid to provide therefrom gaseous, oxidized sulfur;

converter means having an outlet and having an inlet communicating with the output of said chamber means for chemically converting at least a portion of said gaseous, oxidized sulfur into sulfur trioxide;

sensing means connected to said outlet of said converter means for providing a converted temperature signal signifying the temperature of said outlet of said converter means;

modulation means connected to said chamber means and said sensing means for varying the rate of energy transfer associated with the airflow from said source of air upstream of said converter means in response to said converted temperature signal, the magnitude of said rate of energy transfer being changed in the same direction as changes, on an absolute scale, of said converted temperature; and delivery means connected to said outlet of said converter means for delivering said sulfur trioxide to said precipitator, said chamber means comprising:

a burner means having a pair of inputs connected to receive from said source of air and said sulfur-bearing source, sulfur and air for at least providing their combustion products at said output, said modulation means being operable to vary the temperature of the airflow from said source of air to said burner and being further operable to vary the flow rate of the airflow from said source of air to said burner.

2. Apparatus receiving a source of air and a source of sulfur-bearing liquid for conditioning the gas within an electrostatic precipitator in the exhaust stage of an industrial plant, comprising:

a chamber means having an output and an input said chamber means communicating with said source of sulfur-bearing liquid and said source of air for raising the temperature and changing the condition of said liquid to provide therefrom gaseous oxidized sulfur said chamber means including a burner means having a pair of inputs connected to receive from said source of air and said sulfur-bearing source sulfur and air for at least providing their combustion products at said output;

converter means having an outlet and having an inlet communicating with the output of said chamber means for chemically converting at least a portion of said gaseous, oxidized sulfur into sulfur trioxide;

sensing means connected to said outlet of said converter means for providing a converted temperature signal signifying the temperature at said outlet of said converter means;

modulation means connected to said chamber means and said sensing means for varying the rate of energy transfer associated with the airflow from said source of air upstream of said converter means in response to said converted temperature signal the magnitude of said rate of energy transfer being changed in the same direction as changes on an absolute scale of said converted temperature;

delivery means connected to said outlet of said converter means for delivering said sulfur trioxide to said precipitator;

parametric means coupled to said exhaust stage of said industrial plant for providing a parametric signal signifying at least one operating parameter of said exhaust stage of said industrial plant, said operating parameter corresponding to the demand made on said precipitator by said gas; and throttle means connected to said burner means for varying its incoming mass flow rate in response to said parametric signal said throttle means comprising:

sulfur conveying means for varying the flow rate of said sulfur to said burner means in response to said parametric signal said parametric signal corresponding to at least one operating parameter associated with the handling of gas flow at said precipitator; and air means for varying the flow rate of said air to said burner means in response to said parametric signal.

3. Apparatus receiving a source of air and a source of sulfur-bearing liquid for conditioning the gas within an electrostatic precipitator in the exhaust stage of an industrial plant, comprises:

a chamber means having an output and an input said chamber means communicating with said source of sulfur-bearing liquid and said source of air for raising the temperature and changing the condition of said liquid to provide therefrom gaseous oxidized sulfur said chamber means including a burner means having a pair of inputs connected to receive from said source of air and said sulfur-bearing source sulfur and air for at least providing their combustion products at said output;

converter means having an outlet and having an inlet communicating with the output of said chamber means for chemically converting at least a portion of said gaseous, oxidized sulfur into sulfur trioxide;

sensing means connected to said outlet of said converter means for providing a converted temperature signal signifying the temperature at said outlet of said converter means;

modulation means connected to said chamber means and said sensing means for varying the rate of energy transfer associated with the airflow from said source of air upstream of said converter means in response to said converted temperature signal the magnitude of said rate of energy transfer being changed in the same direction as changes on an absolute scale of said converted temperature;

delivery means connected to said outlet of said converter means for delivering said sulfur trioxide to said precipitator;

parametric means coupled to said exhaust stage of said industrial plant for providing a parametric signal signifying at least one operating parameter of said exhaust stage of said industrial plant said operating parameter corresponding to the demand made on said precipitator by said gas said modulation means being operable to vary the rate of energy transfer associated with the airflow from said source of air to said burner means in response to both said converted temperature signal and said parametric signal;

means for varying the temperature of the airflow from said source of air to said burner means in response to both said converted temperature signal and said parametric signal; and means for varying the flow rate of the airflow from said source of air to said burner means in response to said parametric signal.

4. Apparatus according to claim 3 wherein said modulation means is operable to vary the temperature of the airflow from said source of air to said burner means.

5. Apparatus according to claim 3 further comprising:

sulfur conveying means connected to said burner means for varying the flow rate of said sulfur to said burner means in response to said parametric signal.

6. Apparatus receiving a source of air and a source of sulfur for conditioning the gas within an electrostatic precipitator of an exhaust stage of an industrial plant, comprising:

burner means having an output and an input, said burner means being connected to receive from said source of sulfur and said source of air, a mixture of air and sulfur for at least providing their combustion products at said output;

converter means having an inlet connected to the output of said burner means for converting at least a portion of said combustion products into sulfur trioxide;

sensing means connected to said input of said burner means for providing an input temperature signal signifying the preburn temperature of at least a portion from said mixture at said burner means;

modulation means connected to said burner means and said sensing means for varying upstream of said converter means the rate of energy transfer associated with the airflow from said source of air into said burner means in response to said input temperature signal to regulate the temperature of said mixture at said burner means in a direction to provide more efficient operation; and delivery means connected to said converter means for delivering said sulfur trioxide to said precipitator.

7. Apparatus according to claim 6 further comprising:
an air supply;
an airheating means coupled between said air supply and said delivery means for heating and delivering air from said air supply to said delivery means; and
controller means for regulating said airheating means to cause it to heat air to a predeterminded temperature.

8. Apparatus according to claim 6 wherein said modulation means is operable to vary the temperature of the airflow from said source of air to said burner means, said sensing means sensing the temperature of the airflow from said source of air to said burner means.

9. Apparatus according to claim 6 further comprising:
parametric means coupled to said exhaust stage of said industrial plant for providing a parametric signal signifying at least one operating parameter of said exhaust stage of said industrial plant, said operating parameter corresponding to the demand made on said precipitator by said gas; and
throttle means connected to said burner means for varying the incoming mass flow rate associated with at least a portion from said mixture of air and sulfur in response to said parametric signal.

10. Apparatus according to claim 6 further comprising:
parametric means coupled to said exhaust stage of said industrial plant for providing a parametric signal signifying at least one operating parameter of said exhaust stage of said industrial plant, said operating parameter corresponding to the demand made on said precipitator by said gas, said modulation means being operable to vary the rate of energy transfer to said burner means in response to both said input temperature signal and said parametric signal.

11. Apparatus according to claim 10 further comprising:
sulfur conveying means connected to said burner means for varying the flow rate of said sulfur to said burner means in response to said parametric signal.

12. Apparatus receiving a source of air and a source of non-acidic sulfur for conditioning the exhaust gas flowing through an exhaust stage in an electrostatic precipitator to an exhaust stack of an industrial plant, comprising:
a burner means having an output, said burner means being connected to receive from said source of non-acidic sulfur and said source of air, a mixture of air and sulfur for at least providing their combustion products at said output; converter means having an outlet and having an inlet connected to the output of said burner means for converting at least a portion of said combustion products into sulfur trioxide; delivery means connected to said outlet of said converter means for delivering said sulfur trioxide to said precipitator;
parametric means coupled to said exhaust stage of said industrial plant for providing a parametric signal signifying at least one operating parameter associated with the handling of said exhaust gas of said exhaust stage of said industrial plant, said operating parameter corresponding to the demand made on said precipitator by said gas; and throttle means connected to said burner means for varying the incoming mass flow rate of at least a portion from said mixture in response to said parametric signal.

13. Apparatus according to claim 12 wherein said operating parameter corresponds to the output temperature of the exhaust gas from said precipitator.

14. Apparatus according to claim 12 wherein said operating parameter corresponds to the flow rate of said exhaust gas.

15. Apparatus according to claim 12 wherein said industrial plant includes an induced draft fan communicating with said precipitator and said stack, said operating parameter corresponding to the speed at which said fan is being driven.

16. Apparatus according to claim 12 wherein said industrial plant includes an electrically driven, induced draft fan communicating with said precipitator and said stack, said operating parameter corresponding to the power delivered to said fan.

17. Apparatus according to claim 12 wherein said operating parameter corresponds to the opacity of exhaust gas within said stack.

18. Apparatus according to claim 12 wherein said operating parameter corresponds to the power dissipated by said precipitator for useful work and losses.

19. Apparatus according to claim 18 wherein said operating parameter bears a predetermined relationship to the flow rate of said exhaust gas and the power dissipated by said precipitator for useful work and losses.

20. Apparatus according to claim 12 wherein said throttle means is operable to vary the flow rate of sulfur to said burner means.

21. Apparatus according to claim 20 wherein said operating parameter corresponds to the flow rate of said exhaust gas.

22. A method employing a sulfur burner for conditioning the gas within an electrostatic precipitator of an exhaust stage of an industrial plant, comprising the steps of:
introducing and burning a mixture of sulfur and initial air in said burner to form their combustion products;
converting in a predetermined conversion process at least a portion of said combustion products into sulfur trioxide;
sensing the post conversion temperature of said sulfur trioxide after said predetermined conversion process;
modulating upstream of said predetermined conversion process, the rate of energy transfer for said mixture entering said burner by an amount bearing a predetermined relationship to said post conversion temperature, the modulating of said energy flow rate is performed by varying the flow rate of the initial air into said burner; and
delivering the said sulfur trioxide to said precipitator.

23. A method according to claim 22 wherein the modulating of said energy flow rate is performed by variably heating the initial air entering said burner.

24. A method according to claim 22 wherein the modulation of said rate of energy transfer to said burner is performed by varying the airflow rate into said burner by an amount bearing a predetermined relationship to both said post conversion temperature and at least one operating parameter of said industrial plant, said operating parameter corresponding to the demand made on said precipitator by said gas.

25. A method according to claim 22 further comprising the steps of:
measuring at least one operating parameter of said exhaust stage of said industrial plant, said operating parameter corresponding to the demand made on said precipitator by said gas; and
adjusting the incoming mass flow rate of at least a portion from said mixture into said burner in response to the measured operating parameter.

26. A method according to claim 25 further comprising the step of:
setting the flow rate of sulfur to said burner in response to the measured operating parameter.

27. A method according to claim 26 further comprising the step of:
varying the flow rate of the initial air into said burner in response to the measured operating parameter.

28. A method according to claim 22 further comprising the steps of:
supplying heated auxiliary air; and
mixing the heated auxiliary air and said sulfur trioxide prior to delivery to said precipitator.

29. A method according to claim 28 further comprising the step of:
regulating said heated auxiliary air supply toward a predetermined temperature.

30. A method according to claim 29 further comprising the steps of:
measuring at least one operating parameter of said exhaust stage of said industrial plant, said operating parameter corresponding to the demand made on said precipitator by said gas; and
adjusting the incoming mass flow rate of at least a portion from said mixture into said burner in response to the measured operating parameter.

31. A method employing a sulfur burner for conditioning the gas within an electrostatic precipitator of an industrial plant, comprising the steps of:
introducing and burning a mixture of sulfur and initial air in said burner to form their combustion products; sensing the preburn temperature of at least a portion from the mixture entering said burner;
modulating the rate of energy transfer for the mixture entering said burner by an amount bearing a predetermined relationship to said preburn temperature to drive the temperature of at least a portion from the mixture entering said burner toward a regulated temperature to provide more efficient operation;
converting a portion of said combustion products into sulfur trioxide; and
delivering said sulfur trioxide to said precipitator.

32. A method according to claim 31 wherein the modulating of said rate of energy transfer is performed by variably heating the initial air entering said burner.

33. A method according to claim 31 wherein the modulating of said rate of energy transfer is performed by varying the flow rate of said initial air into said burner.

34. A method according claim 31 further comprising the steps of:
supplying heated auxiliary air; and
mixing the heated auxiliary air and said sulfur trioxide prior to delivery to said precipitator.

35. A method according to claim 34 further comprising the step of:
regulating said heated auxiliary air toward a predetermined temperature.

36. A method according to claim 35 further comprising the steps of:
measuring at least one operating parameter of said exhaust stage of said industrial plant, said operating parameter corresponding to the demand made on said precipitator by said gas; and
adjusting the incoming mass flow rate of at least a portion from said mixture into said burner in response to the measured operating parameter.

37. A method according to claim 31 further comprising the steps of:
measuring at least one operating parameter of said exhaust stage of said industrial plant, said operating parameter corresponding to the demand made on said precipitator by said gas; and
adjusting the incoming mass flow rate of at least a portion from said mixture into said burner in response to the measured operating parameter.

38. A method according to claim 37 further comprising the step of:
setting the flow rate of sulfur into said burner in response to the measured operating parameter.

39. A method according to claim 38 further comprising the step of:
varying the flow rate of said initial air into said burner in response to the measured operating parameter.

40. A method employing a sulfur burner for conditioning the exhaust gas within an electrostatic precipitator in an exhaust stage of an industrial plant, comprising the steps of:
introducing and burning a mixture of sulfur and initial air in said burner to form their combustion products; sensing at least one operating parameter associated with the handling of the exhaust gas in said exhaust stage of said industrial plant, said operating parameter corresponding to the demand made on said precipitator by said gas; and
varying the mass flow rate of at least a portion from the mixture entering the burner by an amount bearing a predetermined relationship to said operating parameter; and converting a portion of said combustion products into sulfur trioxide and delivering said conditioning medium to said precipitator.

41. A method according to claim 40 wherein said operating parameter corresponds to the output temperature of the exhaust gas from said precipitator.

42. A method according to claim 40 wherein said operating parameter corresponds to the flow rate of said exhaust gas through said precipitator.

43. A method according to claim 40 wherein said operating parameter corresponds to the power dissipated by said precipitator for useful work and losses.

44. A method according to claim 40 wherein a said industrial plant includes an induced draft fan communicating with said precipitator and a stack, said operating parameter corresponding to the operating speed of said fan.

45. A method according to claim 40 wherein said industrial plant includes an electrically driven, induced draft fan communicating with said precipitator and a stack, said operating parameter corresponding to the power delivered to said fan.

46. A method according to claim 40 wherein said operating parameter corresponds to the opacity of exhaust gas that has left said precipitator.

47. A method according to claim 40 wherein said operating parameter bears a predetermined relationship to the flow rate of said exhaust gas and the power dissipated by said precipitator for useful work and losses.

48. A method according to claim 40 wherein said varying of the flow of the mixture entering said burner is performed by varying the flow rate of sulfur into said burner.

* * * * *

UNITED STATES PATENT AND TRADEMARK OFFICE
CERTIFICATE OF CORRECTION

PATENT NO. : 4,770,674
DATED : September 13, 1988
INVENTOR(S) : Marco G. Tellini et al It is certified that error appears in the above-identified patent and that said Letters Patent is hereby corrected as shown below:

On the title page assignee should read

-(73) Assignee: Belco Acquisition Corp.,

Livingston, N.J. --.

Signed and Sealed this

Twenty-third Day of October, 1990

Attest:

HARRY F. MANBECK, JR.

*Attesting Officer*     *Commissioner of Patents and Trademarks*

REEXAMINATION CERTIFICATE (1760th)
United States Patent [19]
Tellini et al.

[11] B1 4,770,674
[45] Certificate Issued Jul. 28, 1992

[54] GAS CONDITIONING FOR AN ELECTROSTATIC PRECIPITATOR

[75] Inventors: Marco G. Tellini, Montclair; Billy D. Pfoutz, Somerville, both of N.J.

[73] Assignee: Wilhelm Environmental Technologies, Inc.

Reexamination Request:
No. 90/002,621, Jan. 21, 1992

Reexamination Certificate for:
Patent No.: 4,770,674
Issued: Sep. 13, 1988
Appl. No.: 637,993
Filed: Aug. 6, 1984

Certificate of Correction issued Oct. 23, 1990.

[51] Int. Cl.$^5$ ............................................. B03C 1/00
[52] U.S. Cl. .................................. 55/5; 55/106; 423/533; 422/110; 422/111; 422/160; 422/161
[58] Field of Search ................ 55/5, 106; 423/533; 422/110, 111, 160, 161

[56] References Cited
FOREIGN PATENT DOCUMENTS
0062930A1 10/1982 European Pat. Off. .
0062930B1 1/1986 European Pat. Off. .

*Primary Examiner*—Bernard Nozick

[57] ABSTRACT

Apparatus and method for precipitation of fly ash from flue gas of a coal burner wherein liquid sulfur is burned to form $SO_2$. The $SO_2$ is converted to $SO_3$ and injected into the flue gas. The sulfur burning process is modulated and controlled.

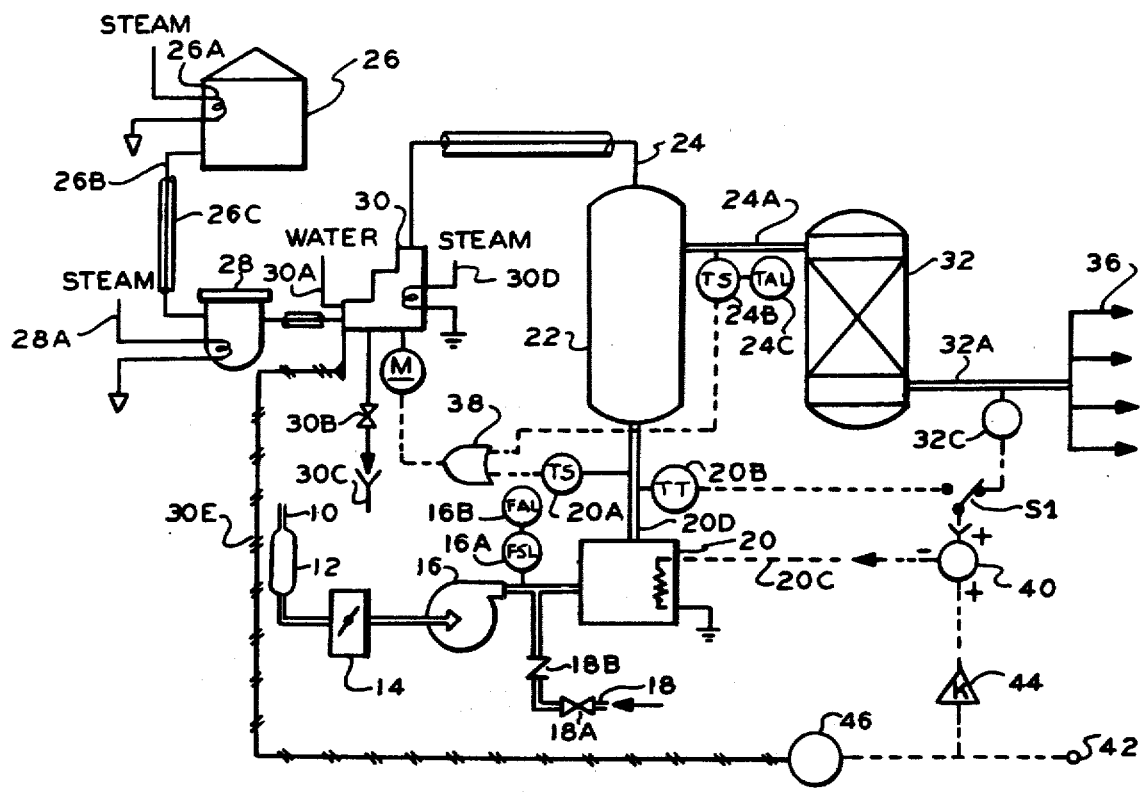

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 7, 18, 19, 28–30, 34–36, 43 and 47 is confirmed.

Claims 1, 6, 9, 10, 12–17, 21–23, 31–33, 40–42, 44–46 and 48 are cancelled.

Claims 2, 3, 8, 11, 20, 24, 25 and 37 are determined to be patentable as amended.

Claims 4, 5, 26, 27, 38 and 39, dependent on an amended claim, are determined to be patentable.

New claims 49–71 are added and determined to be patentable.

2. Apparatus receiving a source of air and a source of sulfur-bearing liquid for conditioning the gas within an electrostatic precipitator in the exhaust stage of an industrial plant, comprising:
  a chamber means having an output and an input said chamber means communicating with said source of sulfur-bearing liquid and said source of air for raising the temperature and changing the condition of said liquid to provide therefrom gaseous oxidized sulfur said chamber means including a burner means having a pair of inputs connected to receive from said source of air and said sulfur-bearing source sulfur and air for at least providing their combustion products at said output;
  converter means having an outlet and having an inlet communicating with the output of said chamber means for chemically converting at least a portion of said gaseous, oxidized sulfur into sulfur trioxide;
  sensing means connected to said outlet of said converter means for providing a converted temperature signal signifying the temperature at said outlet of said converter means;
  modulation means connected to said chamber means and said sensing means for varying the rate of energy transfer associated with the airflow from said source of air upstream of said converter means in response to said converted temperature signal the magnitude of said rate of energy transfer being changed in the same direction as changes on an absolute scale of said converted temperature;
  delivery means connected to said outlet of said converter means for delivering said sulfur trioxide to said precipitator;
  parametric means coupled to said exhaust stage of said industrial plant for providing a parametric signal signifying at least one operating parameter of said exhaust stage of said industrial plant, said operating parameter corresponding to the demand made on said precipitator by said gas *as defined by the power dissipated by the precipitator for useful work and losses*; and
  throttle means connected to said burner means for varying its incoming mass flow rate in response to said parametric signal, said throttle means comprising:
  sulfur conveying means for varying the flow rate of said sulfur to said burner means in response to said parametric signal, said parametric signal corresponding to at least one operating parameter associated with the handling of gas flow at said precipitator; and
  air means for varying the flow rate of said air to said burner means in response to said parametric signal.

3. Apparatus receiving a source of air and a source of sulfur-bearing liquid for conditioning the gas within an electrostatic precipitator in the exhaust stage of an industrial plant, [comprises] *comprising:*
  a chamber means having an output and an input said chamber means communicating with said source of sulfur-bearing liquid and said source of air for raising the temperature and changing the condition of said liquid to provide therefrom gaseous oxidized sulfur said chamber means including a burner means having a pair of inputs connected to receive from said source of air and said sulfur-bearing source sulfur and air for at least providing their combustion products at said output;
  converter means having an outlet and having an inlet communicating with the output of said chamber means for chemically converting at least a portion of said gaseous, oxidized sulfur into sulfur trioxide;
  sensing means connected to said outlet of said converter means for providing a converted temperature signal signifying the temperature at said outlet of said converter means;
  modulation means connected to said chamber means and said sensing means for varying the rate of energy transfer associated with the airflow from said source of air upstream of said converter means in response to said converted temperature signal the magnitude of said rate of energy transfer being changed in the same direction as changes on an absolute scale of said converted temperature;
  delivery means connected to said outlet of said converter means for delivering said sulfur trioxide to said precipitator;
  parametric means coupled to said exhaust stage of said industrial plant for providing a parametric signal signifying at least one operating parameter of said exhaust stage of said industrial plant said operating parameter corresponding to the demand made on said precipitator by said gas *as defined by the power dissipated by the precipitator for useful work and losses;* said modulation means being operable to vary the rate of energy transfer associated with the airflow from said source of air to said burner means in response to both said converted temperature signal and said parametric signal;
  means for varying the temperature of the airflow from said source of air to said burner means in response to both said converted temperature signal and said parametric signal; and
  means for varying the flow rate of the airflow from said source of air to said burner means in response to said parametric signal.

8. Apparatus according to claim [6] *52* wherein said modulation means is operable to vary the temperature of the airflow from said source of air to said burner means, said sensing means sensing the temperature of the airflow from said source of air to said burner means.

11. Apparatus according to claim [10] *53* further comprising:
sulfur conveying means connected to said burner means for varying the flow rate of said sulfur to said burner means in response to said parametric signal.

20. Apparatus according to claim [12] *19* wherein said throttle means is operable to vary the flow rate of sulfur to said burner means.

24. A method according to claim 22 wherein the modulation of said rate of energy transfer to said burner is performed by varying the airflow rate into said burner by an amount bearing a predetermined relationship to both said post conversion temperature and at least one operating parameter of said industrial plant, said operating parameter corresponding to the demand made on said precipitator by said gas *as defined by the power dissipated by the precipitator for useful work and losses.*

25. A method according to claim 22 further comprising the steps of:
measuring at least one operating parameter of said exhaust stage of said industrial plant, said operating parameter corresponding to the demand made on said precipitator by said gas *as defined by the power dissipated by the precipitator for useful work and losses;* and
adjusting the incoming mass flow rate of at least a portion from said mixture into said burner in response to the measured operating parameter.

37. A method according to claim 31 further comprising the steps of:
measuring at least one operating parameter of said exhaust stage of said industrial plant, said operating parameter corresponding to the demand made on said precipitator by said gas *as defined by the power dissipated by the precipitator for useful work and losses;* and
adjusting the incoming mass flow rate of at least a portion from said mixture into said burner in response to the measured operating parameter.

*49. Apparatus according to claim 2 wherein:*
*the sulfur conveying means includes a sulfur pump having a variable pumping rate;*
*said electrostatic precipitator includes an electrical control through which power is delivered to the precipitator; and*
*said parametric means includes a control system having an input connected to said electrical control of the electrostatic precipitator for sensing the power delivered to said precipitator and for increasing the pumping rate of said sulfur pump in response to a lowering of the power being delivered in said precipitator.*

*50. Apparatus according to claim 2 further comprising:*
*an air supply;*
*an air heating means coupled between said air supply and said delivery means for heating and delivering air from said air supply to said delivery means; and*
*controller means for regulating said air heating means to cause it to heat air to a predetermined temperature.*

*51. Apparatus according to claim 5 wherein:*
*the sulfur conveying means includes a sulfur pump having a variable pumping rate;*
*said electrostatic precipitator includes an electrical control through which power is delivered to the precipitator; and*
*said parametric means includes a control system having an input connected to said electrical control of the electrostatic precipitator for sensing the power delivered to said precipitator and for increasing the pumping rate of said sulfur pump in response to a lowering of the power being delivered in said precipitator.*

*52. Apparatus receiving a source of air and a source of sulfur for conditioning the gas within an electrostatic precipitator of an exhaust stage of an industrial plant, comprising:*
*burner means having an output and an input, said burner means being connected to receive from said source of sulfur and said source of air, a mixture of air and sulfur for at least providing their combustion products at said output;*
*converter means having an inlet connected to the output of said burner means for converting at least a portion of said combustion products into sulfur trioxide;*
*sensing means connected to said input of said burner means for providing an input temperature signal signifying the preburn temperature of at least a portion from said mixture at said burner means;*
*modulation means connected to said burner means and said sensing means for varying upstream of said converter means the rate of energy transfer associated with airflow from said source of air into said burner means in response to said input temperature signal to regulate the temperature of said mixture at said burner means in a direction to provide more efficient operation;*
*delivery means connected to said converter means for delivering said sulfur trioxide to said precipitator;*
*parametric means coupled to said exhaust stage of said industrial plant for providing a parametric signal signifying at least one operating parameter of said exhaust stage of said industrial plant, said operating parameter corresponding to the demand made on said precipitator by said gas as defined by the power dissipated by the precipitator for useful work and losses; and*
*throttle means connected to said burner means for varying the incoming mass flow rate associated with at least a portion from said mixture of air and sulfur in response to said parametric signal.*

*53. Apparatus receiving a source of air and a source of sulfur for conditioning the gas within an electrostatic precipitator of an exhaust stage of an industrial plant, comprising:*
*burner means having an output and an input, said burner means being connected to receive from said source of sulfur and said source of air, a mixture of air and sulfur for at least providing their combustion products at said output;*
*converter means having an inlet connected to the output of said burner means for converting at least a portion of said combustion products into sulfur trioxide;*
*sensing means connected to said input of said burner means for providing an input temperature signal signifying the preburn temperature of at least a portion from said mixture at said burner means;*
*modulation means connected to said burner means and said sensing means for varying upstream of said converter means the rate of energy transfer associated with airflow from said source of air into said burner means in response to said input temperature signal to* regulate the temperature of said mixture at said burner means in a direction to provide more efficient operation;

delivery means connected to said converter means for delivering said sulfur trioxide to said precipitator;

parametric means coupled to said exhaust stage of said industrial plant for providing a parametric signal signifying at least one operating parameter of said exhaust stage of said industrial plant, said operating parameter corresponding to the power demand made on said precipitator by said gas as defined by the dissipated by the precipitator for useful work and losses;

said modulation means being operable to vary the rate of energy transfer to said burner means in response to both said input temperature signal and said parametric signal.

54. Apparatus receiving a source of air and a source of sulfur for conditioning the gas within an electrostatic precipitator of an exhaust stage of an industrial plant, comprising:

burner means having an output and an input, said burner means being connected to receive from said source of sulfur and said source of air, a mixture of air and sulfur for at least providing their combustion products at said output;

converter means having an outlet and having an inlet connected to the output of said burner means for converting at least a portion of said combustion products into sulfur trioxide;

delivery means connected to the outlet of said converter means for delivering said sulfur trioxide to said precipitator;

means for supplying and mixing auxiliary air with said sulfur trioxide between the outlet of said converter means and said delivery means and prior to delivery to said precipitator;

means for heating said auxiliary air;

first sensing means connected to said input of said burner means for providing an input temperature signal signifying the preburn temperature of at least a portion from said mixture at said burner means;

second sensing means connected between said outlet of said converter means and said delivery means for providing a post conversion temperature signal of the post conversion temperature of said sulfur trioxide after mixing with said auxiliary air;

modulation means connected to said burner means and selectively connectable to said first and second sensing means for varying upstream of said converter means the rate of energy transfer associated with the airflow from said source of air into said burner means in response selectively to said input temperature signal and said post conversion temperature signal to regulate the temperature of said mixture at said burner means in a direction to provide more efficient operation; and means for selectively connecting said modulating means to said first and second sensing means.

55. Apparatus according to claim 54 further comprising:

parametric means coupled to said exhaust stage of said industrial plant for providing a parametric signal signifying at least one operating parameter of said exhaust stage of said industrial plant, said operating parameter corresponding to the power demand made on said precipitator by said gas as defined by the dissipated by the precipitator for useful work and losses; and throttle means connected to said burner means for varying the incoming mass flow rate associated with at least a portion from said mixture of air and sulfur in response to said parametric signal.

56. Apparatus according to claim 55 wherein:

the throttle means includes a sulfur pump having a variable pumping rate;

said electrostatic precipitator includes an electrical control through which power is delivered to the precipitator; and said parametric means includes a control system having an input connected to said electrical control of the electrostatic precipitator for sensing the power delivered to said precipitator and for increasing the pumping rate of said sulfur pump in response to a lowering of the power being delivered in said precipitator.

57. Apparatus according to claim 56 wherein:

said throttle means is connected to said burner means for simultaneously varying the incoming mass flow rate of both said sulfur and air into said burner means in response to said parametric signal to maintain an unchanged concentration of sulfur dioxide and air in said combustion products.

58. Apparatus according to claim 20 wherein:

said throttle means includes a sulfur pump having a variable pumping rate;

said electrostatic precipitator includes an electrical control through which power is delivered to the precipitator; and said parametric means includes a control system having an input connected to said electrical control of the electrostatic precipitator for sensing the power delivered to said precipitator and for increasing the pumping rate of said sulfur pump in response to a lowering of the power being delivered in said precipitator.

59. Apparatus receiving a source of air and a source of non-acidic sulfur for conditioning the exhaust gas flowing through an exhaust stage in an electrostatic precipitator to an exhaust stack of an industrial plant, comprising:

a burner means having an output, said burner means being connected to receive from said source of non-acidic sulfur and said source of air, a mixture of air and sulfur for at least providing their combustion products at said output;

converter means having an outlet and having an inlet connected to the output of said burner means for converting at least a portion of said combustion products into sulfur trioxide;

delivery means connected to said outlet of said converter means for delivering said sulfur trioxide to said precipitator;

parametric means coupled to said exhaust stage of said industrial plant for providing a parametric signal signifying at least one operating parameter associated with the handling of said exhaust gas of said exhaust stage of said industrial plant, said operating parameter corresponding to the demand made on said precipitator by said gas as defined by the power dissipated by the precipitator for useful work and losses;

throttle means connected to said burner means for varying the incoming mass flow rate of at least a portion from said mixture in response to said parametric signal;

said throttle means including a sulfur pump having a variable pumping rate;

said electrostatic precipitator including an electrical control through which power is delivered to the precipitator; and said parametric means including a control system having an input connected to said electrical control of the electrostatic precipitator for sensing the power delivered to said precipitator and for increasing the pumping rate of said sulfur pump in response to a lowering of the power being delivered in said precipitator.

60. Apparatus according to claim 59 wherein:

said throttle means is connected to said burner means for simultaneously varying the incoming mass flow rate of both said sulfur and air into said burner means in response to said parametric signal to maintain an unchanged concentration of sulfur dioxide and air in said combustion products.

61. Apparatus according to claim 60 further comprising:

means for supplying and mixing auxiliary air with said sulfur trioxide between the outlet of said converter means and said delivery means and prior to delivery to said precipitator;

air heating means for heating auxiliary air; and controller means for regulating said air heating means to cause it to heat said auxiliary air to a predetermined temperature.

62. A method according to claim 26 wherein:

the setting of the flow rate of sulfur to said burner includes the step of increasing the flow rate of sulfur to said burner in response to a lowering of the power dissipated by said precipitator.

63. A method according to claim 29 further comprising the steps of:

measuring at least one operating parameter of said exhaust stage of said industrial plant, said operating parameter corresponding to the demand made on said precipitator by said gas as defined by the power dissipated by the precipitator for useful work and losses; and adjusting the incoming mass flow rate of at least a portion from said mixture into said burner in response to the measured operating parameter.

64. A method according to claim 63 wherein:

the setting of the flow rate of sulfur to said burner includes the step of increasing the flow rate of sulfur to said burner in response to a lowering of the power dissipated by said precipitator.

65. A method according to claim 63 further comprising the step of:

setting the flow rate of both sulfur and air into said burner in response to the measured operating parameter to maintain an unchanged concentration of sulfur dioxide and air in said combustion products.

66. A method according to claim 63 wherein:

the sensing of the post conversion temperature of said sulfur trioxide is a sensing of the post conversion temperature of said sulfur trioxide after mixing with said auxiliary air.

67. A method according to claim 40 further comprising the step of:

supplying heated auxiliary air; and mixing the heated auxiliary air and said sulfur trioxide prior to delivery to said precipitator.

68. A method according to claim 67 further comprising the step of:

regulating said heated auxiliary air toward a predetermined temperature.

69. A method according to claim 43 further comprising the step of:

setting the flow rate of sulfur to said burner in response to the measured operating parameter, said setting of the flow rate of the sulfur including the step of increasing the flow rate of sulfur to said burner in response to a lowering of the power dissipated by said precipitator.

70. A method according to claim 69 further comprising the step of:

setting the flow rate of both sulfur and air into said burner in response to the measured operating parameter to maintain an unchanged concentration of sulfur dioxide and air in said combustion products.

71. A method according to claim 43 further comprising the step of:

supplying heated auxiliary air;

mixing the heated auxiliary air and said sulfur trioxide prior to delivery to said precipitator; and regulating said heated auxiliary air supply toward a predetermined temperature.

* * * * *

REEXAMINATION CERTIFICATE (1904th)
United States Patent [19]
Tellini et al.

[11] B2 4,770,674
[45] Certificate Issued  Jan. 19, 1993

[54] GAS CONDITIONING FOR AN ELECTROSTATIC PRECIPITATOR

[75] Inventors: Marco G. Tellini, Montclair; Billy D. Pfoutz, Somerville, both of N.J.

[73] Assignee: Lab, S.A., Lyon Cedex, France

Reexamination Request:
No. 90/002,756, Jun. 17, 1992

Reexamination Certificate for:
Patent No.: 4,770,674
Issued: Sep. 13, 1988
Appl. No.: 637,993
Filed: Aug. 6, 1984

Reexamination Certificate B1 4,770,674 issued Jul. 28, 1992.

Certificate of Correction issued Oct. 23, 1990.

[51] Int. Cl.⁵ ............................................. B03C 1/00
[52] U.S. Cl. ............................................. 55/5; 55/106; 423/533; 422/110; 422/111; 422/160; 422/161
[58] Field of Search .................... 55/5, 106; 423/533; 422/110, 111, 160, 161

[56] References Cited

U.S. PATENT DOCUMENTS 2,864,456  12/1958  Hall et al. ............................. 183/7

FOREIGN PATENT DOCUMENTS

0062930A1  10/1982  European Pat. Off.

*Primary Examiner*—Bernard Nozick

[57] ABSTRACT

Apparatus and method for precipitation of fly ash from flue gas of a coal burner wherein liquid sulfur is burned to form $SO_2$. The $SO_2$ is converted to $SO_3$ and injected into the flue gas. The sulfur burning process is modulated and controlled.

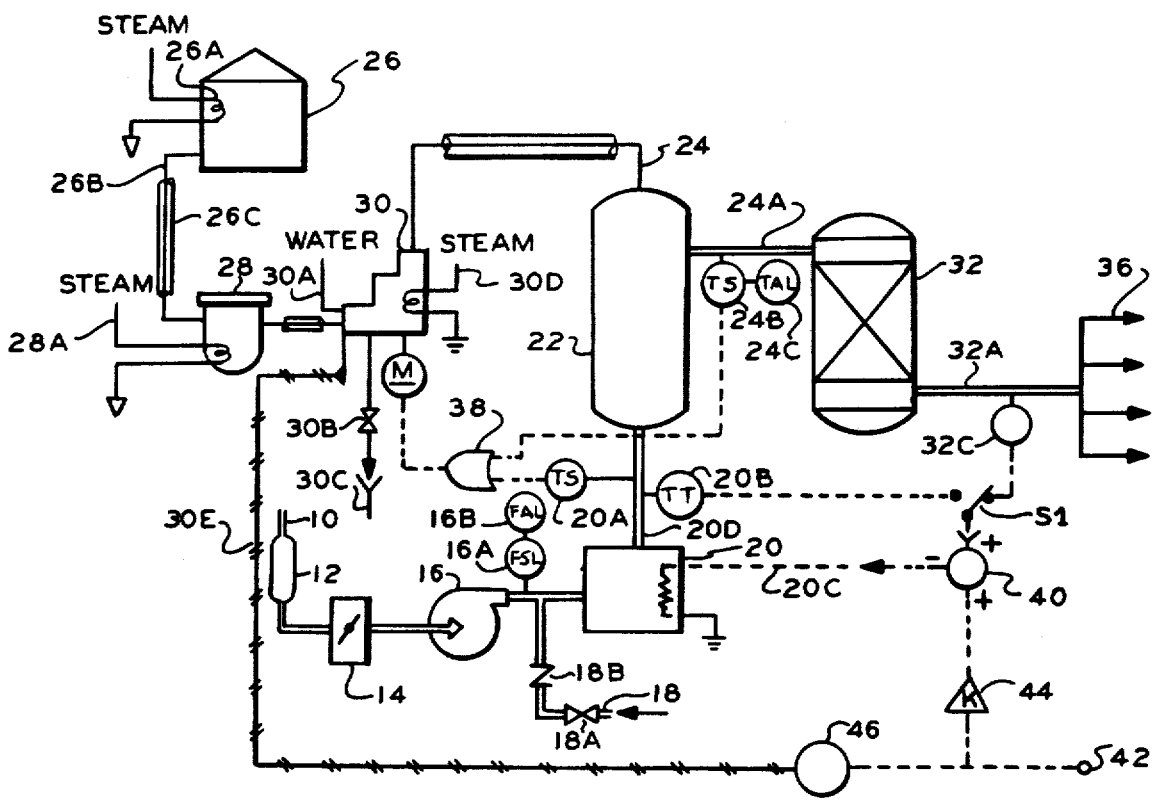

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 2-5, 7, 8, 11, 18-20, 24-30, 34-39, 43, 47 and 49-71 is confirmed.

Claims 1, 6, 9, 10, 12-17, 21-23, 31-33, 40-42, 44-46 and 48 were previously cancelled.

* * * * *

US 4,770,674 C3

(12) EX PARTE REEXAMINATION CERTIFICATE (4895th)
United States Patent
Tellini et al.

(10) Number: US 4,770,674 C3
(45) Certificate Issued: Jan. 13, 2004

(54) GAS CONDITIONING FOR AN ELECTROSTATIC PRECIPITATOR

(75) Inventors: Marco G. Tellini, Montclair, NJ (US); Billy D. Pfoutz, Somerville, NJ (US)

(73) Assignee: Neptune Technologies, Lyons Cedex (FR)

Reexamination Request:
No. 90/005,289, Mar. 10, 1999
No. 90/005,688, Mar. 31, 2000

Reexamination Certificate for:
Patent No.: 4,770,674
Issued: Sep. 13, 1988
Appl. No.: 06/637,993
Filed: Aug. 6, 1984

Reexamination Certificate B2 4,770,674 issued Jan. 19, 1993

Reexamination Certificate B1 4,770,674 issued Jul. 28, 1992

Certificate of Correction issued Oct. 23, 1990.

(51) Int. Cl.$^7$ .............................. B03C 1/00; B03C 3/013
(52) U.S. Cl. ...................... 95/4; 95/58; 96/19; 96/52; 422/110; 422/111; 422/160; 422/161; 423/533

(58) Field of Search ................................. 96/18, 21–24, 96/52, 74; 95/71; 422/110, 111, 160, 161; 423/533; 110/216, 217; 431/28, 41; 122/1 A

(56) References Cited

U.S. PATENT DOCUMENTS 3,689,213 A  *  9/1972  Guerrieri ...................... 95/60

FOREIGN PATENT DOCUMENTS

| EP | 0062930 | 10/1982 |
| GB | 859784 | 1/1961 |
| GB | 1093617 | 12/1967 |

OTHER PUBLICATIONS

Weyers et al., "Operating Experience With Flue Gas Conditioning Systems At Commonwealth Edison Company," (Apr. 1981).
Darby et al., "The Use of Electrostatic Precipitators in Current Power Station Practice," p. 1–13 (1974).

* cited by examiner

Primary Examiner—Richard L. Chiesa

(57) ABSTRACT

Apparatus and method for precipitation of fly ash from flue gas of a coal burner wherein liquid sulfur is burned to form $SO_2$. The $SO_2$ is converted to $SO_3$ and injected into the flue gas. The sulfur burning process is modulated and controlled.

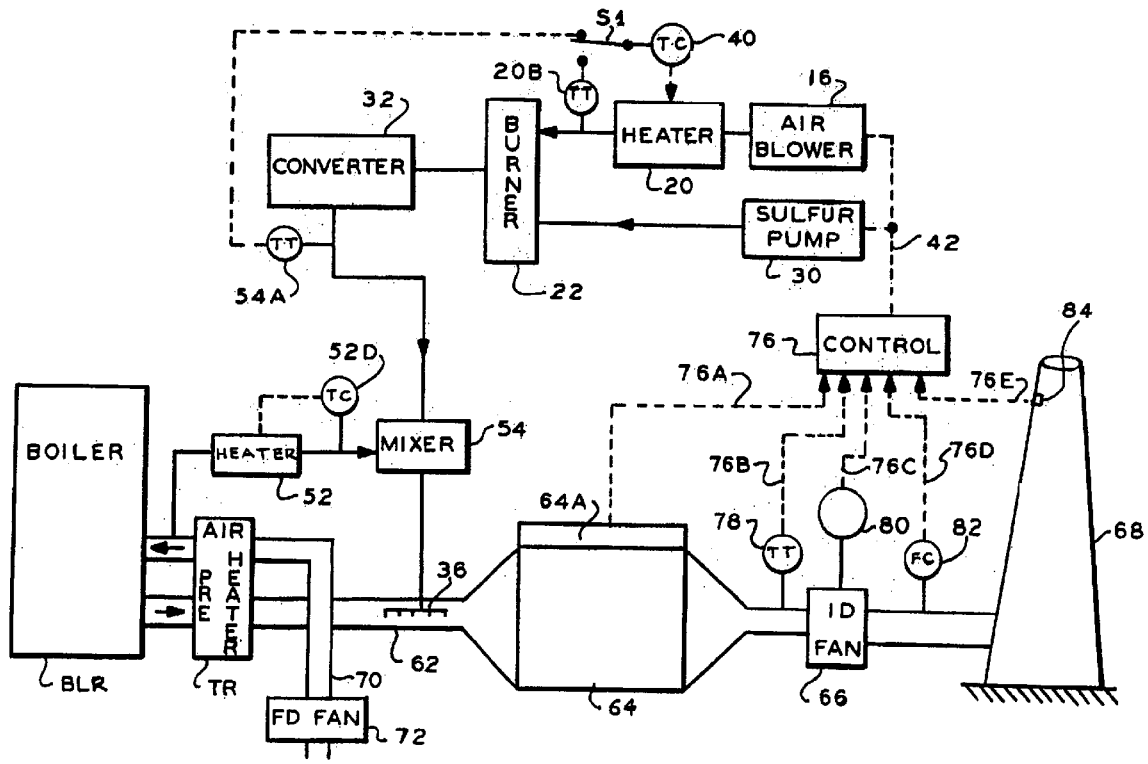

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 6, 9, 10, 12–17, 21–23, 31–33, 40–42, 44–46, and 48 were previously cancelled.

Claims 2–5, 7, 8, 11, 18–20, 24–30, and 34–39, 43, 47, 49–71 are cancelled.

\* \* \* \* \*